United States Patent
LaSaosa

Patent Number: 5,509,173
Date of Patent: Apr. 23, 1996

[54] FASTENING SYSTEM FOR HANDGRIPS

[75] Inventor: Jose L. A. LaSaosa, Saragossa, Spain

[73] Assignee: Vitrex, S.A., Zaragoza, Spain

[21] Appl. No.: 140,246

[22] Filed: Oct. 21, 1993

[30] Foreign Application Priority Data

Apr. 22, 1993 [ES] Spain .................. 9301093

[51] Int. Cl.⁶ ........................... A47J 45/06
[52] U.S. Cl. ........................................ 16/114 A
[58] Field of Search ............. 16/110 A, 114 A

[56] References Cited

U.S. PATENT DOCUMENTS

| | | | |
|---|---|---|---|
| 3,691,605 | 9/1972 | Witte | 16/110 A |
| 4,083,081 | 4/1978 | Witte | 16/114 A |
| 4,127,914 | 12/1978 | Fischbach | 16/114 A |
| 4,825,505 | 5/1989 | Witte | 16/110 A |

FOREIGN PATENT DOCUMENTS

| | | | |
|---|---|---|---|
| 2501404 | 7/1976 | Germany | 16/110 A |
| 2518954 | 8/1976 | Germany | 16/110 A |
| 2729726 | 1/1979 | Germany | 16/110 A |
| 7609915 | 3/1977 | Netherlands | 16/110 A |

Primary Examiner—Maurina T. Rachuba
Assistant Examiner—Donald M. Gurley
Attorney, Agent, or Firm—Baker & McKenzie

[57] ABSTRACT

A fastening system for attaching handgrips to a household item, such as a piece of cookware. The handgrip includes a recess at one end into which a connecting spring is inserted. Apertures in the handgrip extend from the outside surface of the handgrip to the recess, and the spring is capable of being pre-assembled in the recess prior to attachment of the handgrip to the household item. Pre-assembly of the spring is achieved by lightly compressing the spring against sloping ribs formed in the recess, and engagement of the ends of the spring in the apertures. Attachment of the handgrip to the household item is accomplished when the spring is deflected into gripping engagement with a brace rigidly attached to the outside surface of the household item. By extending a tool through the apertures, the handgrip may be removed from the household item.

2 Claims, 2 Drawing Sheets

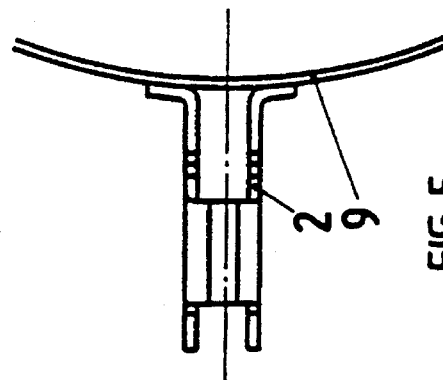
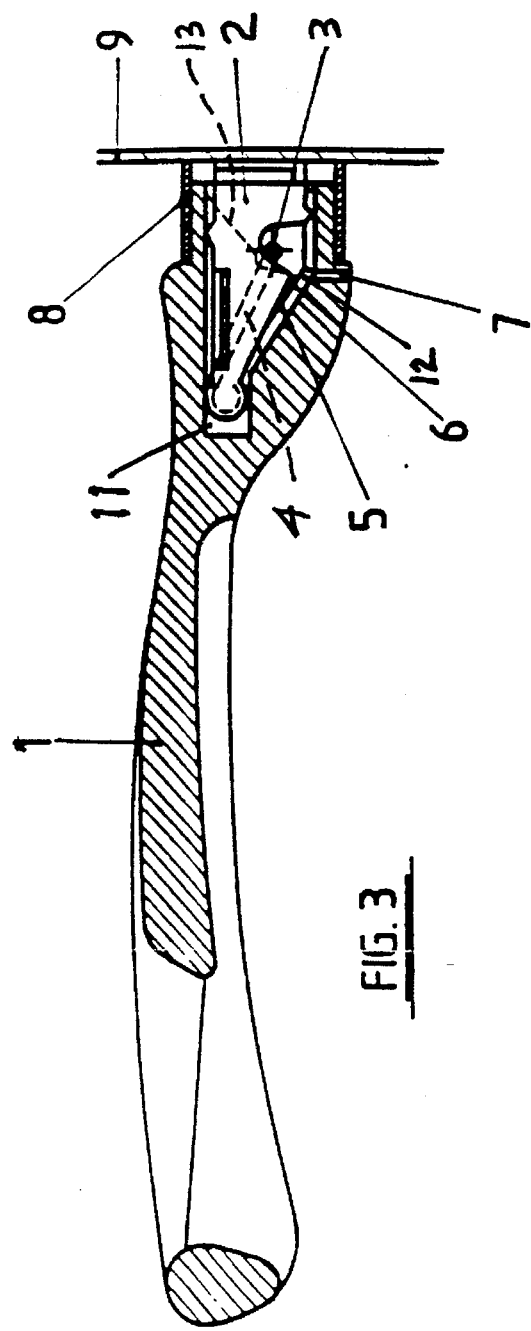
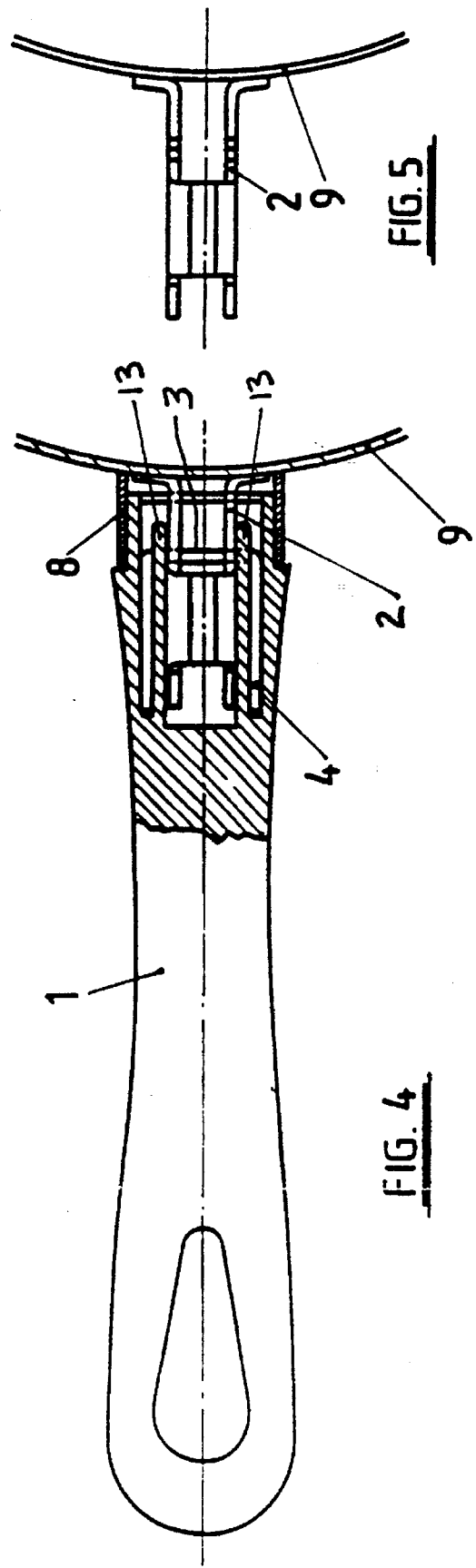

FASTENING SYSTEM FOR HANDGRIPS

BACKGROUND AND SUMMARY OF THE INVENTION

This invention relates to a fastening system for use in attaching handgrips to items such as kitchenware or similar products. The systems known until now in this field include various mechanical procedures conceived to provide for the fastening of a handgrip to a container (pots, saucepans, frying pans, etc.) such as soldering and conventional fastening means, e.g. nuts and threaded studs. Soldering causes the rapid aging of the household item due to the breakage of the wall area where the soldering is made, or the rapid wearing out of the item due to the loosening of the fastening means.

There are fastening devices which are essentially comprised of a brace soldered onto the wall of the container and a handgrip in whose body is provided a cavity into which the brace penetrates. The handgrip is thus fastened onto the brace by means of a spring.

However, the link obtained between the handgrip and its brace in these systems is of a permanent type in which both parts are inseparably linked to each other. The result is a nondetachable fastening device whose useful life ends with that of the container itself onto which the handgrip is attached.

The invention is essentially a fastening brace carried by the exterior of a wall of a piece of cookware, and a handgrip intended to remain fastened thereto through the action of a specially designed spring which causes the final link between both parts.

The purpose of the invention is to make possible the link between the handgrip and the household item to be moved or transported manually or mechanically, without the use of any other supplementary fastening means, with the total elimination of looseness and of the possibility of the pulling apart or inadvertent detachment of the handgrip.

The connection between the brace and the handgrip takes place through longitudinal movement of those two parts in the direction toward the center of the piece of cookware whereby the handgrip is pushed over the brace. An interlocking spring causes the final fastening between the handgrip and the brace. The described constructional arrangement makes it possible to quickly assemble the handgrip to the piece of cookware, both manually as well as by robotized or otherwise automated systems.

A further purpose of the invention is to provide a means to detach the handgrip from engagement with the brace when there is a need to clean, repair or replace it.

The combination between both parts is not permanent. The body of the handgrip has boreholes which allow for the introduction of any sharp-pointed tool or jig through which pressure can be applied on the spring which, upon flexing, frees the handgrip, thus enabling the latter to be detached at will, for the purpose and effect described above.

The objects and advantages of the invention will be better understood upon a reading of the following specification read in conjunction with the accompanying drawings.

BRIEF DESCRIPTION OF THE DRAWINGS

For greater clarity and to facilitate the understanding of the invention, a drawing sheet is attached showing an example of the practical application of the present invention wherein:

FIG. 3 is a vertical sectional view of a cookware handle in accordance with the invention.

FIG. 4 is a horizontal sectional view of the handle shown in FIG. 3.

FIG. 5 is a top plan view of the brace shown in FIGS. 3 and 4.

DETAILED DESCRIPTION OF THE INVENTION

The invention is an improved elastic fastening device for handgrips of containers in general and particularly of kitchen and other household items, such as, for example, casseroles, pots, platters, saucepans, etc., or any other containers or utensils which are designed to include handgrips.

Figure 1:
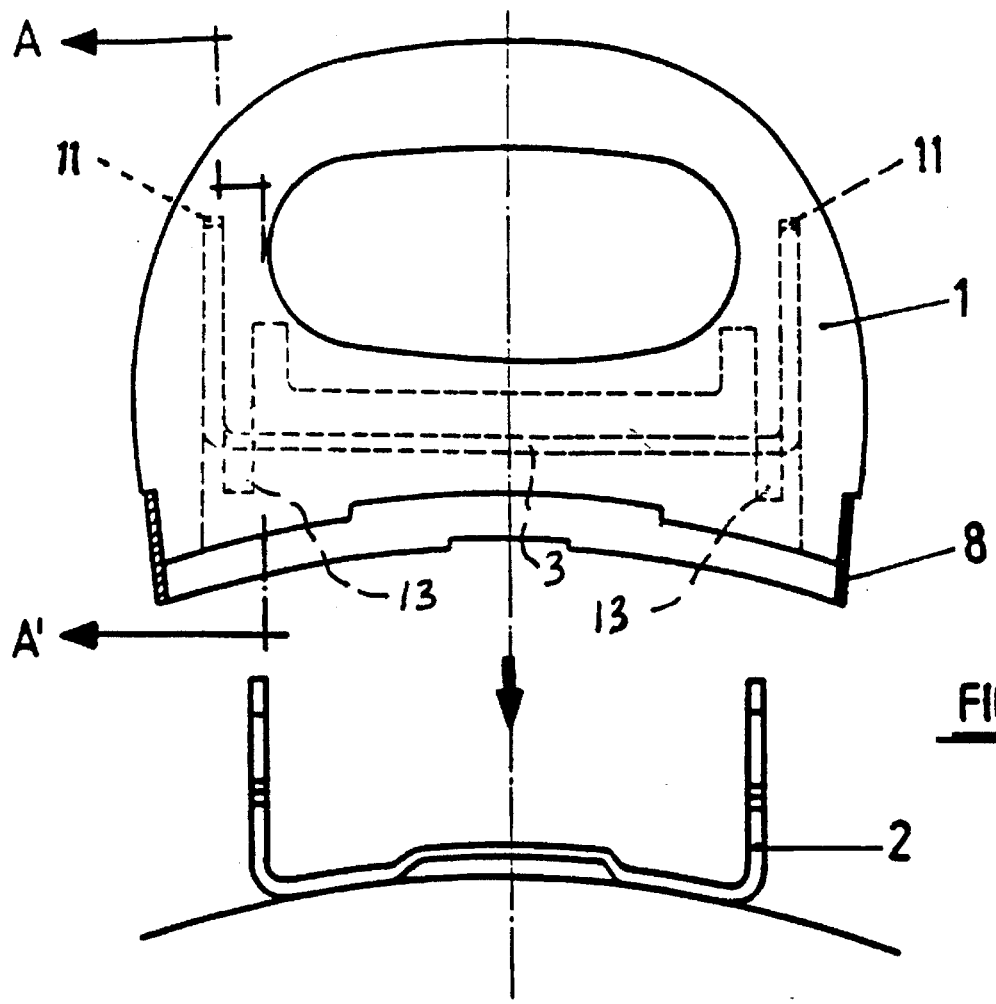
FIG. 1 is a top plan view of a handgrip in accordance with the present invention. The brace attached to the household item with the spring and the interior recesses which provide for entrance of said brace are shown in a dotted line.
Figure 2:
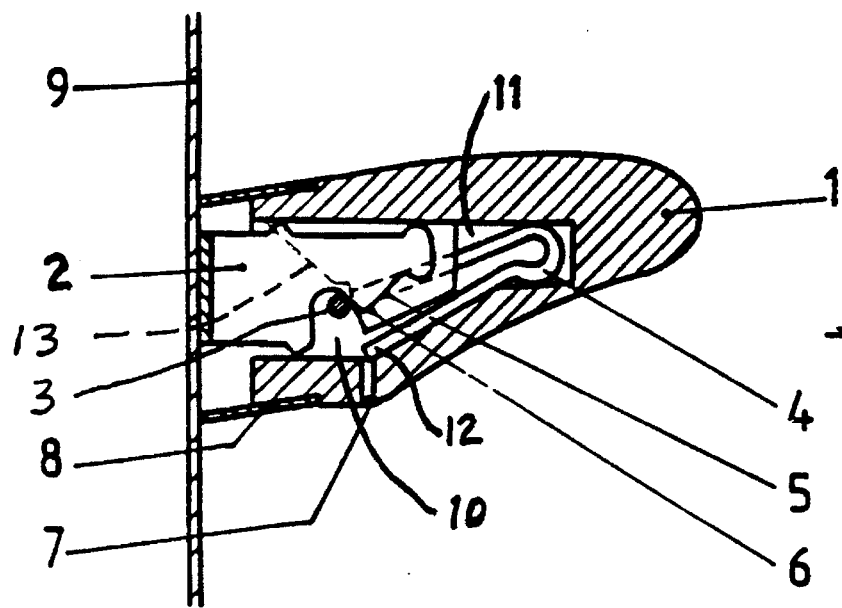
FIG. 2 is a vertical sectional view of the handgrip installed in the brace taken along line A—A' of FIG. 1.

The fastening system of the present invention is based on the provision of a handgrip 1, which could be a variety of shapes, dimensions and materials, one end of which includes a cavity or female connecting recess 10 (FIG. 2) intended to allow for the penetration of a brace 2 (FIG. 1).

The brace 2 is comprised of a "U" shaped spring with two wings which are bent in such a way that the profile of the brace includes a slanted ramp 5 and a tooth or latch 6. The ends of each of the wings are further bent to serve as a base for fastening the brace by soldering, riveting, or any other procedure, onto the external side of the wall of the container 9.

The installation of the handgrip 1 on the brace 2 is made by exerting axial pressure on the handgrip 1 once the penetration of the brace 2 into the above-mentioned female recess 10 is initiated. The arrow in FIG. 1 shows the direction of the relative movement of the handgrip 1 and the brace 2 required for connection.

Consequently, the fastening of the handgrip 1 takes place through the application of pressure between the brace 2 and the "U" shaped spring 4, causing downward deflection of the horizontal latch bar 3 as it slides along the ramps 5 of the brace 2.

The spring 4 is introduced with its rounded tips extending into the slots 11 located at the sides of the recess in the end of the handgrip. The latch bar 3 of the spring 4 is free to move in a downward direction in response to pressure exerted on it by the ramps 5 of the brace 2. The spring's 4 own elasticity results in a locking effect because the latch bar 3 presses upwardly on the teeth 6 of the brace 2.

In the recess 10 are sloped ribs 13 which are integral with the handgrip body. The ribs 13 contact the latch bar 3 when the spring 4 is inserted into the recess 10. The ribs are positioned such that the latch bar 3 must move slightly downward and compress the spring 4 before the ends 12 reach the apertures 7 as the spring is inserted into the recess 10. During insertion of the spring 4 into the recess 10, the free ends 12 slide along the side of the recess adjacent to the perforations. As the latch bar contacts the ribs 13, further insertion of the spring 4 causes downward movement of the latch bar 3. The downward and inward movement of the latch bar 3 compresses the spring 4 and eventually causes a locking of the spring 4 in the recess 10 when the ends 12 reach the apertures 7. This arrangement provides the recess 10 with the ability to retain the spring 4 prior to insertion of the brace 2 into the recess 10. Such arrangement facilitates the assembly of the handgrip by automated means, such as robots.

The locking would be final, preventing any possibility of again separating the handle from the brace, except that the perforations 7 in the handle body allow for the insertion of any sharp pointed jig with which pressure may be exerted on the ends 12 of the spring 4 in order to free the ends 12 from the apertures 7 and thus free the handgrip 1 from the brace 2.

The link between the handgrip 1 and the brace 2 also includes a tubular support 8 which is fitted over the end of the handgrip having the recess 10, and the tubular support 8 abuts the wall 9 of the container. It should be noted that the loads carried by the household items are transferred to the handgrips primarily by the brace 2 bearing upon the inside surfaces of the recess 10, and by the tubular support bearing upon the outside surface of the household items and a shoulder formed on the outside surface of the handgrip. At three locations on each of the wings of the brace 2, loads are transferred from the handgrip 1 to the brace 2. The brace 2 is dimensioned to slide in a close-fitting way into the recess 10 with a minimal tolerance.

While a specific embodiment of the invention has been shown and described, it will be apparent to those skilled in the art that numerous alternatives, modifications, and variations of the embodiment shown can be made without departing from the spirit and scope of the appended claims.

I claim:

1. A fastening system for cookware comprising a brace rigidly extending from and carried by a piece of cookware, a handgrip, and connecting spring means for releasably connecting said handgrip to said brace, said handgrip having an attachment recess in one end for receiving said spring means and said brace, said spring means having two arms joined by a latch bar, said brace having at least one tooth for engaging said latch bar, each of said arms having two spring segments joined at one end, the opposite end of a first of said spring segments of each of said arms being joined to said latch bar, and the opposite end of the second of said two spring segments comprising a free end of said spring means, said free ends of said spring means being adjacent to apertures in said handgrip, said apertures comprising retention means for receiving and engaging said free ends and preventing removal of said spring means from said handgrip unless said free ends are deflected, said apertures providing access to said fret ends from outside said attachment recess, said latch bar being positioned adjacent to said brace so as to engage said at least one tooth on said brace, whereby after said tooth and said latch bar are engaged, removal of said handgrip from said cookware is only possible when both of said free ends are deflected away from said retention means, said attachment recess including means for allowing an assembler to removeably pre-assemble said spring means to said handgrips prior to assembling said handgrip to said brace, said means for allowing an assembler to removeably preassemble said spring means comprising a sloped surface in said attachment recess for causing deflection of said latch bar such that at least one of said free ends of said spring means engages one of said apertures.

2. A fastening system in accordance with claim 1 wherein:
said apertures provide access for removing said handgrip from said piece of cookware, wherein removal requires a tool to be inserted into said apertures to deflect said spring means and release said spring means from said handgrip and said handgrip from said piece of cookware.

* * * * *